INVENTORS
D. L. PETERS
D. L. ALEXANDER
BY
ATTORNEYS

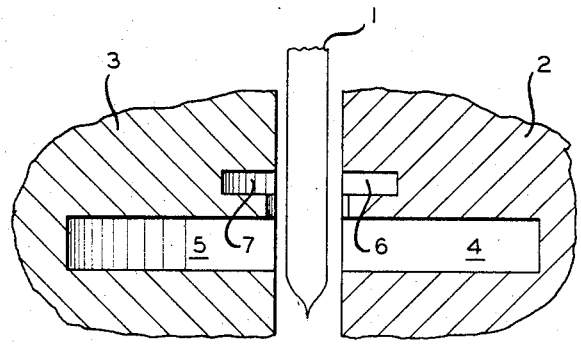
FIG. 1    (PRIOR ART)
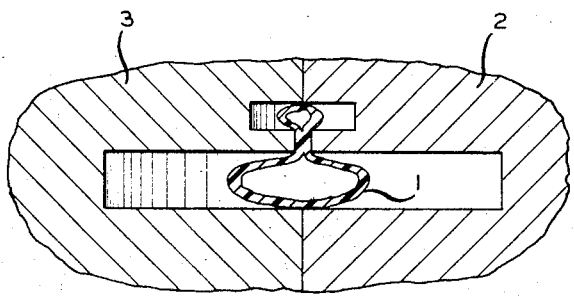
FIG. 2    (PRIOR ART)
INVENTORS
D. L. PETERS
D. L. ALEXANDER
BY
ATTORNEYS

Jan. 28, 1969     D. L. PETERS ET AL     3,424,829
METHOD AND APPARATUS FOR BLOW MOLDING HOLLOW ARTICLES
WITH INTEGRALLY MOLDED HOLLOW HANDLES

INVENTORS
D. L. PETERS
D. L. ALEXANDER
BY
ATTORNEYS

United States Patent Office 3,424,829
Patented Jan. 28, 1969

3,424,829
METHOD AND APPARATUS FOR BLOW MOLDING HOLLOW ARTICLES WITH INTEGRALLY MOLDED HOLLOW HANDLES
Donald L. Peters and Doyle L. Alexander, Bartlesville, Okla., assignors to Phillips Petroleum Company, a corporation of Delaware
Filed May 4, 1965, Ser. No. 452,996
U.S. Cl. 264—89                                       5 Claims
Int. Cl. B29d 23/03; B29c 5/06

This invention relates to method and apparatus for blow molding hollow articles. In one of its aspects, it relates to a method for blowing a hollow article with a hollow handle formed integral therewith wherein the body of the article and handle are roughly formed from a parison, a section of the parison is pinched out to form the handle opening, and the blowing is completed. In another of its aspects, it relates to an apparatus for blow molding a hollow article with a hollow handle molded integrally therewith, the apparatus comprising separable mold halves, at least one of which having a longitudinal recess within the mold cavity parallel to a plane of separation of the mold halves, slidable pinch off members adapted to slide at a direction perpendicular to the longitudinal direction of the longitudinal recess and parallel to the plane of separation of the molds, and means for blowing the parison to conform to the shape of the mold.

When blow molding hollow objects, it is desirable to expand the parison more or less uniformly so that the blown object will have uniform thickness throughout. Uniformity of thickness presents little problem when the shape of the blown object conforms more or less to the shape of the parison. A bottle is such an example. However, when it is desirable to produce odd shaped articles, problems arise. When it is desirable to produce thin, planar articles, such as large covers, for example, the shape of the mold and the blowing method become important. When it is desirable to attach a handle to a planar surface, more problems arise.

One method of making an article with a handle on a planar surface is to mold the article with slots and make the handle separately. After the blowing operation, the handle can be inserted. This method is expensive since it requires two molding operations and an assembly operation.

Another method of making a planar article with a handle on a planar surface is to mold the handle integrally with the article as it is formed. The conventional method of integrally molding a hollow handle onto a flat planar hollow article is to use a mold which has the handle cavity and the article cavity divided in half. Such a method and apparatus are illustrated in FIGURES 1 and 2. In FIGURE 1, a parison 1 is placed between two mold halves 2 and 3. The mold halves contain cavities 4 and 5 for the body of the article and cavities 6 and 7 for the handle portion. As can be seen in FIGURE 2, when the mold cavity is closed a portion of the parison in mold cavities 6 and 7 is pinched off from the rest of the parison in mold cavities 4 and 5. As the blowing takes place, the parison in the mold cavities 4 and 5 will expand a great deal more than that in cavities 6 and 7. Thus, the thickness of the material in the article body will be too thin or substantially less than that in the handle portion, or in extreme cases the parison will rupture in this area making the fabrication of such a part impossible by this method. It can be seen that this type of operation produces waste. If the thickness of the parison is adjusted to give the desired thickness in the main body of the article, the thickness of the handle will be too great. If the thickness of the parison is adjusted to the desired thickness of the handle, the thickness of material in the body of the article will be too small.

We have now found that by splitting the mold cavity longitudinally and providing in one mold half a sliding core insert for pinching out the handle opening, the thickness of the molded article can be easily regulated without waste of material or thinning.

By various aspects of this invention, one or more of the following, or other, objects can be obtained.

It is a object of this invention to provide an apparatus for making a hollow object wherein a handle and body have substantially the same thickness.

It is a further object of this invention to provide a method for making a hollow article with a handle integrally molded to a flat planar surface without waste or thinning of material.

Other aspects, objects, and the several advantages of this invention are apparent to one skilled in the art from a study of this disclosure, the drawings and the appended claims.

According to the invention, a hollow article having a handle integrally molded therewith is produced. There are provided separable mold halves, the plane of separation of the mold halves being parallel to the plane of the handle to be formed in the surface. One of the mold halves has a recess to form the handle. When the parison roughly fills the space provided for the handle, at least one sliding core insert moves in a direction parallel to the plane of separation of the mold halves and perpendicular to the longitudinal direction of the handle recess to pinch out the hollow handle portion of the object.

The invention can be best understood by reference to the accompanying drawings, of which:

FIGURES 1 and 2 show a cross section through a conventional mold showing the conventional method of molding such an article;

Figure 3:
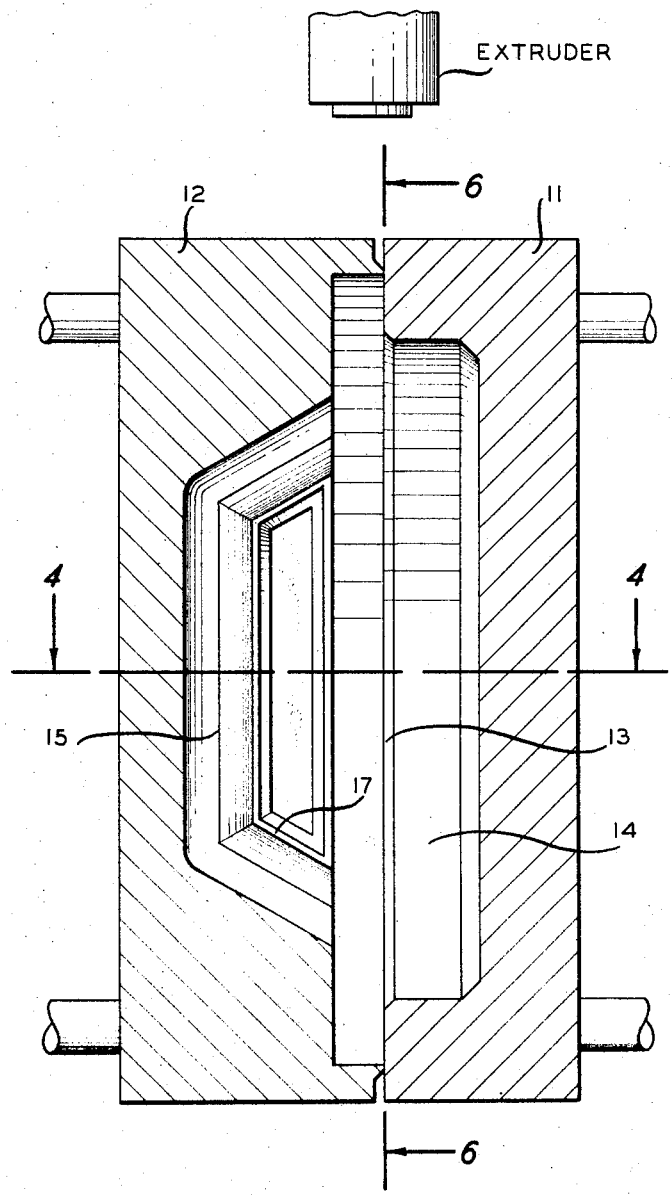
FIGURE 3 is a cross section through a pair of mold halves according to the invention.
Figure 4:
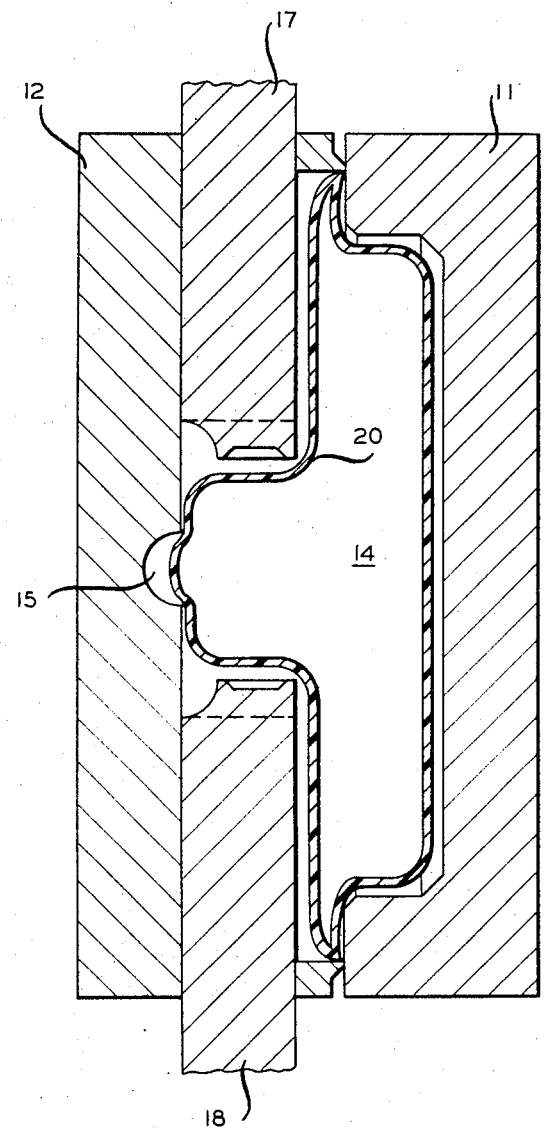
FIGURE 4 is a section through IV—IV of FIGURE 3 showing the operation of the molding process in the initial stages.
Figure 5:
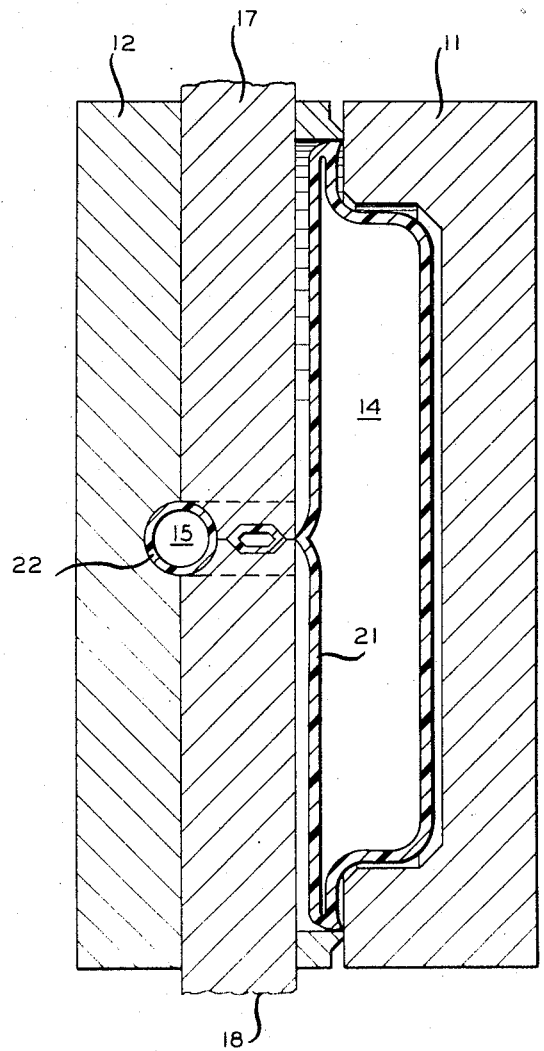
FIGURE 5 is a view similar to FIGURE 4 at a later stage in the operation.
Figure 6:
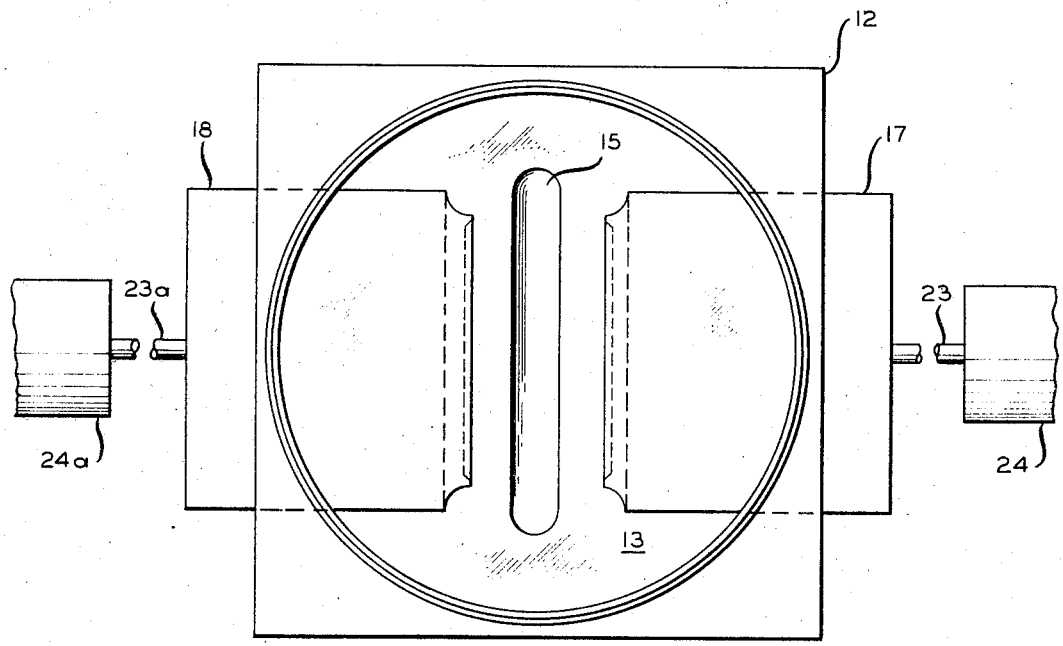
FIGURE 6 is a section through line VI—VI of FIGURE 3 which shows a view of the mold half according to the invention.
Figure 7:
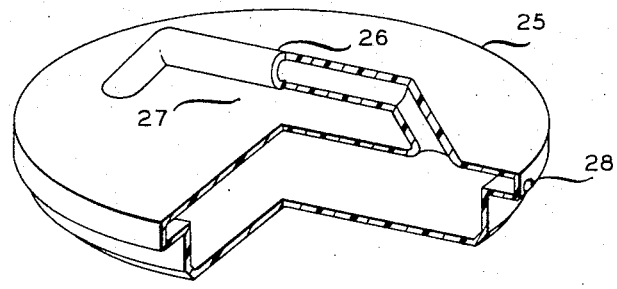
FIGURE 7 is an axonometric view in partial section of an article produced according to the invention.

Referring now to FIGURES 3–7, mold halves 11 and 12 forming cavity 13 having a main portion 14 and a handle portion 15 are provided. Handle portion 15 is a longitudinal recess in mold half 12, the plane of the cavity being parallel to the plane of separation of the mold halves. At least one sliding core 17 is provided within mold half 12. According to the preferred embodiment of the invention, two sliding inserts 17 and 18, as shown in FIGURES 4 and 5, are provided. Rods 23 and 23a, actuated by air cylinders 24 and 24a, serve as the actuation means for cores 17 and 18. An article which can be formed according to the invention is shown in FIGURE 7. The article shown is a water cooler lid with an integrally molded hollow handle. The main body 25 has attached to the top planar surface a hollow handle 26 having handle opening 27.

In operation, a partially blown parison 20 is placed into halves 11 and 12. The parison can be pinched off with any suitable sealing means such as a clamp like device located directly between the mold and the extruder. It is within the scope of the invention to pinch off a parison with the mold halves also, and preblow the parison within the mold halves. During the preblowing stage, the sliding inserts are withdrawn as shown in FIGURE 4. When the preblown parison roughly conforms to the shape of cavities 14 and 15, sliding inserts 17 and 18 are advanced to pinch out the hollow handle opening in the parison. As can be seen in FIGURES 4 and 5, the parison is positioned at the outer portion of the mold at the edge and is maintained in that position as the sliding inserts 17 and 18 are advanced to pinch out the hollow handle. The parison is maintained adjacent the inserts 17 and 18 along the line parallel to the direction of movement of inserts 17 and 18. This pinching out operation leaves an open channel on either side of the inserts between the main body of the parison 21 and the handle portion 22. The blowing operation is then continued until the parison conforms to the shape of the mold. When the blown object has cooled, the slidable inserts 17 and 18 are retracted, the mold halves are opened, and the article is removed. Blowing can be accomplished by any suitable method, for instance by extruding the parison over a blow pin or by needle blowing. The hole, 28, resulting from the blow pin technique is shown in FIGURE 7. It is obvious that the invention will work more satisfactorily when the parison is partially blown prior to the pinching off operation. Otherwise, a deflated parison may not sufficiently fill the handle cavity to be caught by the sliding inserts.

Further, a preblown closed end parison can be placed into the mold cavity, thus eliminating the need of the mold halves to pinch off the ends of the open end hollow parison.

The invention can be carried out with any suitable thermoplastic material. Preferred materials are polyethylene, polypropylene, polybutene and copolymers thereof.

While the invention has been described with regard to using a pair of slidable mold inserts, it is obvious that a single sliding core could be used instead of the two. In such a case, the mold core would slide across the handle mold cavity, thereby pinching out a portion of the preblown parison in the same manner as the two cores pinched off the parison as has been hereinbefore described. Similarly, three or more cores could be used, to produce a triangular handle, for instance.

SPECIFIC EXAMPLE

A water cooler lid with a handle molded integrally therewith was blow molded according to the invention. For this lid Marlex® 5003, a copolymer of ethylene and butene having a density of 0.95 and a melt index of 0.3, was used. The stock temperature was 380° F. The parison was extruded in a time of 11 seconds, placed into the mold cavity and preblown. The sliding core inserts were then activated to pinch out the handle cavity and the final blowing was effected. The blow pressure was 120 p.s.i. and the total cycle time was 100 seconds. The lid weighed 17 ounces.

Reasonable variation and modification are possible within the scope of the foregoing disclosure, drawing, and the appended claims to the invention, the essence of which is that a planar object is blow molded with a hollow channel formed integrally therewith, by using a pair of mold halves, one of which contains a longitudinal recess parallel to the plane of separation of the mold halves, and at least one sliding core in said mold halves to pinch out a hollow channel area therein.

We claim:

1. A method for forming a flat blow molded hollow article having a hollow channel integrally molded on a flat surface thereof, said method comprising closing a pair of mold halves to pinch off a heated parison, preblowing said parison to roughly conform to the shape of said molds, one of which contains a longitudinal recess parallel to a plane of separation of said molds, moving a pair of slidable inserts perpendicular to the longitudinal direction of said recess to pinch out an area within said preblown parison while maintaining said parison at the sides thereof at the outer portion of the mold cavity of said mold halves adjacent said pair of slidable inserts, leaving a communicable passage around said pinched off area, and blowing the parison to fully conform to the mold cavity.

2. A method for forming a substantially flat blow molded article having a hollow channel integrally molded on a flat surface thereof and protruding from said flat surface, said method comprising closing a pair of mold halves to pinch off a heated parison, preblowing said parison to roughly conform to the shape of said molds, one of which contains a longitudinal recess parallel to a plane of separation of said molds, moving at least one slidable insert perpendicular to said longitudinal recess to pinch out an area within said preblown parison while maintaining said parison at the edge of said mold halves adjacent said slidable insert, thereby leaving a communicable passage around said pinched off area, and blowing the parison to fully conform to the mold cavity.

3. An apparatus for blow molding a flat hollow article having a hollow channel protrusion integrally molded on a flat surface thereof, said apparatus comprising a pair of movable mold halves, each of said mold halves having a shallow planar mold cavity, one of said mold halves containing a longitudinal recess within said mold cavity, said recess being parallel to a plane of separation of said mold halves, said one of said mold halves containing at least one slidable insert which is movable in a direction substantially perpendicular to the longitudinal direction of said longitudinal recess and parallel to said plane of separation of said mold halves, said insert being adapted to move into and out of said longitudinal recess to form a hollow channel portion of a blow molded article and means for maintaining the edges of a parison adjacent said slidable insert at the outer portion of said mold cavity as said slidable insert is actuated.

4. An apparatus for blow molding a flat hollow article having a hollow channel integrally molded on a flat surface thereof, said apparatus comprising a pair of movable mold halves, each of said mold halves having a shallow planar mold cavity, one of said mold halves containing a recess within said mold cavity, said recess being parallel to a plane of separation of said mold halves, said one of said mold halves containing at least two slidable inserts which are movable in a direction substantially parallel to said plane of separation of said mold halves, said inserts being adapted to move into and out of said recess to form a hollow channel portion of a blow molded article and means to maintain a parison at portions thereof adjacent said slidable inserts at the outer portion of said mold cavities as said inserts are actuated.

5. An apparatus according to claim 4 wherein there is provided a means for sealing off an open end hollow parison.

References Cited

UNITED STATES PATENTS

| | | | |
|---|---|---|---|
| 2,349,177 | 5/1944 | Kopitke | 264—98 X |
| 3,004,285 | 10/1961 | Hagen | 18—5 X |
| 3,012,285 | 12/1961 | Gasmire | 264—97 |
| 3,048,891 | 8/1962 | Maass. | |
| 3,120,679 | 2/1964 | Price et al. | 18—5 X |

FOREIGN PATENTS

| | | |
|---|---|---|
| 220,099 | 2/1959 | Australia. |
| 688,997 | 3/1953 | Great Britain. |
| 949,972 | 2/1964 | Great Britain. |

ROBERT F. WHITE, *Primary Examiner.*

A. R. NOE, *Assistant Examiner.*

U.S. Cl. X.R.

18—5; 264—98